United States Patent
Seki

(10) Patent No.: US 10,929,387 B2
(45) Date of Patent: Feb. 23, 2021

(54) RELATIONAL DATABASE MANAGEMENT METHOD AND UPDATE REFLECTION APPARATUS

(71) Applicant: FUJITSU LIMITED, Kawasaki (JP)

(72) Inventor: Eiji Seki, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 15/925,823

(22) Filed: Mar. 20, 2018

(65) Prior Publication Data

US 2018/0293270 A1    Oct. 11, 2018

(30) Foreign Application Priority Data

Apr. 6, 2017    (JP) .............................. JP2017-076281

(51) Int. Cl.
    *G06F 16/23*        (2019.01)
    *G06F 16/22*        (2019.01)
    *G06F 16/25*        (2019.01)
    *G06F 16/28*        (2019.01)

(52) U.S. Cl.
    CPC ........ *G06F 16/2379* (2019.01); *G06F 16/221* (2019.01); *G06F 16/254* (2019.01); *G06F 16/258* (2019.01); *G06F 16/284* (2019.01)

(58) Field of Classification Search
CPC .... G06F 16/219; G06F 16/2365; G06F 16/29; G06F 16/2372; G06F 16/2379; G06F 16/24553; G06F 16/24561
See application file for complete search history.

(56) References Cited

U.S. PATENT DOCUMENTS

| 5,548,757 | A | * | 8/1996 | Matsuyama | .......... G06F 11/004 |
| 6,226,411 | B1 | * | 5/2001 | Hiyoshi | .................... G06F 7/36 |
| | | | | | 345/428 |
| 6,453,314 | B1 | * | 9/2002 | Chan | ................... G06F 16/2365 |
| 6,732,124 | B1 | * | 5/2004 | Koseki | ................ G06F 11/1435 |
| 8,819,088 | B2 | * | 8/2014 | Iyer | ...................... G11B 27/329 |
| | | | | | 707/783 |
| 9,183,320 | B2 | * | 11/2015 | Ono | ........................ G06F 16/81 |
| 9,547,659 | B1 | * | 1/2017 | Barber | ............... G06F 16/2379 |

(Continued)

FOREIGN PATENT DOCUMENTS

| JP | 2010-539616 | 12/2010 |
| JP | 2015-185104 | 10/2015 |

OTHER PUBLICATIONS

Takushi Hashida et al., "Concurrency control technique for OLXP system based on PostgreSQL", Proceeding of the 8th Forum on Web and Databases (WebDB Forum 2015), Information Processing Society of Japan, Nov. 17, 2015, pp. 64-71 (8 pages).

(Continued)

*Primary Examiner* — Daniel A Kuddus
(74) *Attorney, Agent, or Firm* — Fujitsu Patent Center

(57) ABSTRACT

An update reflection apparatus includes a memory and a processor coupled to the memory. The processor is configured to accumulate first information relating to first records in a write buffer of a row-type. The first records are to update a database of an append-only type. The database is in a column-format. The processor is configured to convert a second record of the first records to a column format. The second record satisfies a specific condition. The processor is configured to append the converted second record to the database.

12 Claims, 14 Drawing Sheets

(56) References Cited

U.S. PATENT DOCUMENTS

| | | | |
|---|---|---|---|
| 9,922,077 B2* | 3/2018 | Barber | G06F 16/2379 |
| 2007/0016548 A1* | 1/2007 | Iyer | G11B 27/329 |
| 2008/0005077 A1* | 1/2008 | Eggebraaten | G06F 16/219 |
| 2009/0240663 A1 | 9/2009 | Plattner et al. | |
| 2013/0060740 A1* | 3/2013 | Ono | G06F 16/81 |
| | | | 707/693 |
| 2015/0185104 A1* | 7/2015 | Widas, III | G01N 19/02 |
| | | | 73/1.08 |
| 2015/0278310 A1 | 10/2015 | Kawabata | |
| 2017/0046377 A1* | 2/2017 | Barber | G06F 16/2365 |
| 2017/0075950 A1* | 3/2017 | Barber | G06F 16/2379 |
| 2017/0075951 A1* | 3/2017 | Barber | G06F 16/2379 |
| 2018/0075116 A1* | 3/2018 | Nakamura | G06F 16/258 |
| 2018/0095982 A1* | 4/2018 | Hakamata | G06F 16/148 |
| 2018/0307615 A1* | 10/2018 | Takeda | G06F 3/0616 |
| 2019/0228018 A1* | 7/2019 | Seki | G06F 16/221 |

OTHER PUBLICATIONS

JPOA—Office Action of Japanese Patent Application No. 2017-076281 dated Nov. 4, 2020 with Machine Translation ( 7 pages).

* cited by examiner

FIG. 2B

EXTENT (ROS)

| TRANSACTION DATE | PRODUCT CODE | ... |
|---|---|---|
| 2015/2/15 | 1134 | ... |
| 2015/5/17 | 1342 | ... |
| 2015/11/5 | 1345 | ... |

WOS (13)

| TRANSACTION DATE | PRODUCT CODE | ... |
|---|---|---|
| 2015/5/5 | 1987 | ... |
| 2015/8/10 | 1345 | ... |
| 2016/9/11 | 1623 | ... |
| 2016/10/19 | 1424 | ... |

↑ STEP #2 NEARBY RECORDS IN WOS ARE APPENDED TO EXTENT REAR PART

EXTENT (ROS)

| TRANSACTION DATE | PRODUCT CODE | ... |
|---|---|---|
| 2015/2/15 | 1134 | ... |
| 2015/5/17 | 1342 | ... |
| 2015/11/5 | 1345 | ... |
| 2015/5/5 | 1987 | ... |
| 2015/8/10 | 1345 | ... |

DATA IS REDUCED BY TWO ROWS BECAUSE OF DELETION OF FOUR ROWS AND APPENDING OF TWO ROWS, BUT EMPTY AREA DOES NOT NECESSARILY HAVE TO BE FILLED

WOS (13)

| TRANSACTION DATE | PRODUCT CODE | ... |
|---|---|---|
| 2016/9/11 | 1623 | ... |
| 2016/10/19 | 1424 | ... |

|  | OLTP (UPDATE PROCESSING, SEARCH FOR SMALLER NUMBER OF PIECES OF DATA) | OLAP (AGGREGATION OF LARGE AMOUNT OF DATA) |
|---|---|---|
| ROW TYPE | ○FAST | ×SLOW |
| COLUMN TYPE (COLUMNAR) | ×SLOW | ○FAST |

F I G . 1 2

| | column1 |
|---|---|
| BLOCK #1<br>0 TO 5 | 0 |
| | 4 |
| | 1 |
| | 5 |
| BLOCK #2<br>13 TO 18 | 15 |
| | 18 |
| | 13 |
| | 14 |
| BLOCK #3<br>53 TO 60 | 53 |
| | 48 |
| | 60 |
| | 55 |

TABLE tbl1

FIG.13B

EXAMPLE IN WHICH BRIN IS INEFFECTIVE

CASE IN WHICH PRODUCT CODE ON FIRST ROW IS UPDATED

| TRANSACTION DATE | PRODUCT CODE | ... |
|---|---|---|
| 2015/1/1 | 1234 | ... |
| : | : | : |
| 2016/5/15 | 1134 | ... |
| 2016/8/16 | 1543 | ... |
| 2016/10/17 | 1342 | ... |
| 2015/1/1 | 1987 | ... |

TRANSACTIONS IN YEAR 2015 { 2015/1/1, 1234 }

TRANSACTIONS IN YEARS 2015 AND 2016 { 2016/5/15 ... 2016/10/17 }

ROW WITH FAR TRANSACTION DATE COMES TO NEARBY POSITION

EVEN IN CASE OF AGGREGATION OF TRANSACTIONS IN YEAR 2015, SKIP IS NOT ALLOWED

FIG.13A

EXAMPLE IN WHICH BRIN IS EFFECTIVE

CASE IN WHICH ONLY INSERTION IS CARRIED OUT

| TRANSACTION DATE | PRODUCT CODE | ... |
|---|---|---|
| 2015/1/1 | 1234 | ... |
| : | : | : |
| 2016/5/15 | 1134 | ... |
| 2016/8/16 | 1543 | ... |
| 2016/10/17 | 1342 | ... |

TRANSACTIONS IN YEAR 2015

TRANSACTIONS IN YEAR 2016

CLOSER TRANSACTION DATES COLLECT AT CLOSER POSITIONS

IN CASE OF AGGREGATION OF TRANSACTIONS IN YEAR 2015, SKIP IS ALLOWED

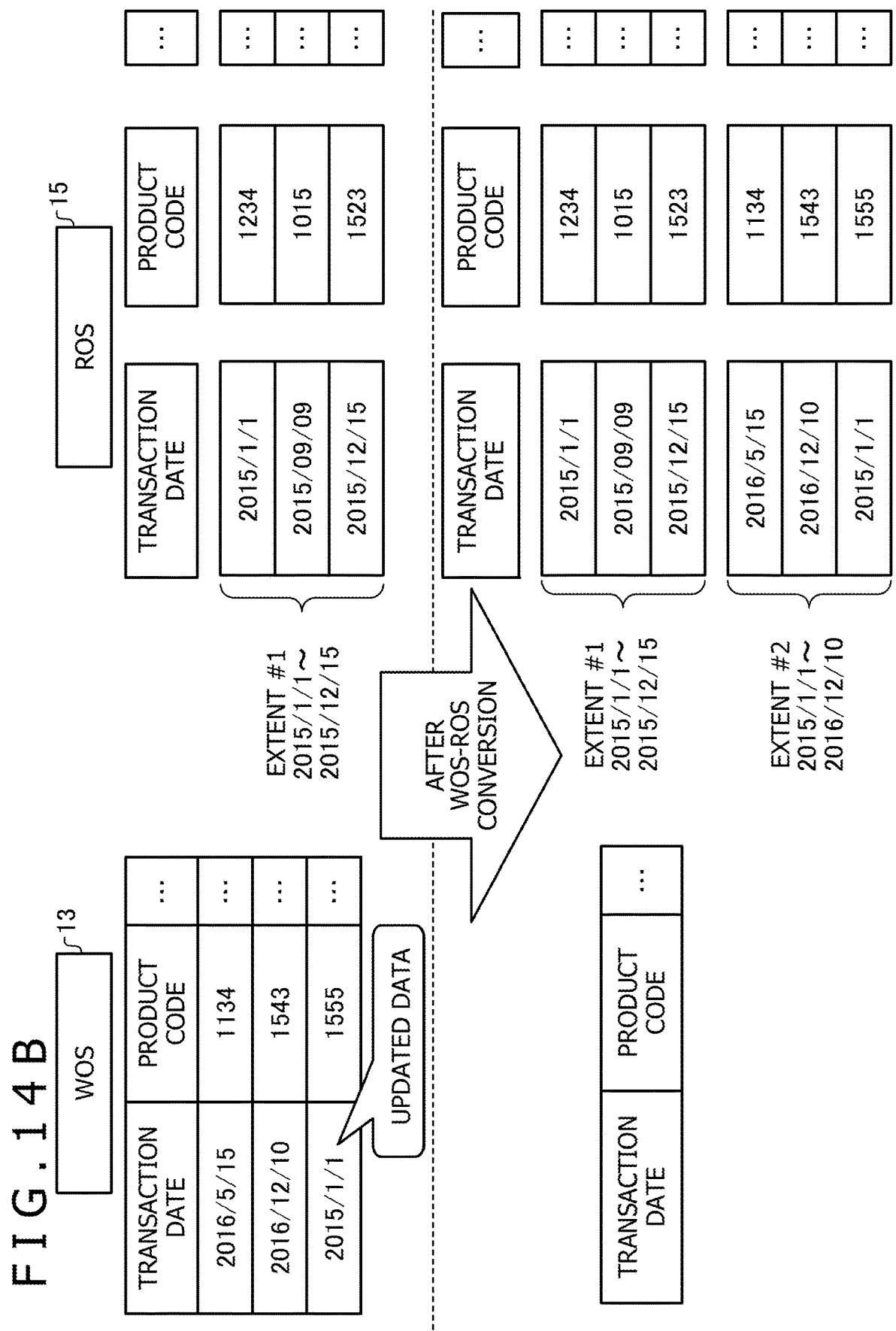

RELATIONAL DATABASE MANAGEMENT METHOD AND UPDATE REFLECTION APPARATUS

CROSS-REFERENCE TO RELATED APPLICATION

This application is based upon and claims the benefit of priority of the prior Japanese Patent Application No. 2017-76281, filed on Apr. 6, 2017, the entire contents of which are incorporated herein by reference.

FIELD

The embodiment discussed herein is related to a relational database management method, an update reflection apparatus, and a non-transitory computer-readable recording medium having stored therein a program.

BACKGROUND

In a relational database management system (RDBMS), two kinds of processing, online transaction processing (OLTP) and online analytical processing (OLAP), are executed. The OLTP is processing of executing insertion, update, and deletion of records and the OLAP is processing of executing statistical processing and so forth on already-accumulated records.

FIG. 9 is a diagram illustrating characteristics of OLTP and OLAP. In FIG. 9, the row type represents a row-type database that collectively stores pieces of data included in one row (record) and the column type (columnar) represents a column-type database that collectively stores pieces of data included in one column.

As illustrated in FIG. 9, in the OLTP, update processing to a database occurs but a search for a smaller number of pieces of data is carried out compared with the OLAP. Therefore, in the OLTP, the processing is faster when the row type is used than when the column type is used. On the other hand, in the OLAP, aggregation of a large amount of data is carried out in aggregation or the like relating to a specific column. Therefore, in the OLAP, the processing is faster when the column type is used than when the row type is used. For this reason, operation of insertion, update, and deletion of records is carried out to a row-type database and processing of transferring data of the row-type database to a column-type database is asynchronously executed every day, every week, or the like.

In recent years, it has been desired to make use of the most recent aggregated data for businesses. For example, a delivery plan of the afternoon is designed based on the sales status of the morning. For this reason, needs for a database management system having advantages of both the row-type database and the column-type database are increasing.

FIG. 10 and FIG. 11 are diagrams for explaining an outline of an architecture of the database management system having advantages of both the row-type database and the column-type database. FIG. 10 is a diagram for explaining processing to update Structured Query Language (SQL) and FIG. 11 is a diagram for explaining processing to search SQL. Here, the update SQL is SQL that updates a database by carrying out insertion, update, or deletion of records and the search SQL is SQL that searches the database.

As illustrated in FIG. 10 and FIG. 11, the database management system having advantages of both the row-type database and the column-type database includes a database (DB) buffer 1a. The DB buffer 1a is an area on a main memory and includes a write optimized store (WOS) 13 that is a row-type write buffer and a global read optimized store (ROS) 15 with a column-type data structure.

As illustrated in FIG. 10, in the processing to the update SQL, an original table 11 that is a row-type database and the WOS 13 are updated synchronously with the update SQL. Furthermore, WOS-ROS conversion to reflect data of the WOS 13 in the global ROS 15 is carried out asynchronously with the update SQL.

Furthermore, in the processing to the search SQL, as illustrated in FIG. 11, the most recent data stored by the WOS 13 is converted to a column-type local ROS 17a and a search is carried out on the local ROS 17a and the global ROS 15. Hereinafter, the global ROS 15 will be represented simply as the ROS 15.

Furthermore, in the OLAP, a Block-Range Index (BRIN) is used for increase in the speed of the search. FIG. 12 is a diagram for explaining a BRIN. FIG. 12 represents a BRIN when a column (column1) is one table (tbl1) and the block size is 4.

As represented in FIG. 12, the range of the value about block #1 is "0 to 5" and the range of the value about block #2 is "13 to 18" and the range of the value about block #3 is "53 to 60." In the BRIN, the range of the value is added to each block as an index. Thus, for example, in a search of "SELECT*FROM tbl1 WHERE column1>50;" the search engine may skip block #1 and block #2 by using the index and may carry out the search at high speed.

The BRIN is typically effective when the data of the column is time-series data and is effective regarding a column in which a closer value comes to a closer position.

There is a technique in which each record is distributed, according to the value of an element, to any of plural data processing units that execute processing of dividing data of a table format into a column format and rearranging data in accordance with the value of the element included in each record and processing results by the respective data processing units are joined and stored. According to this technique, the update performance may be improved.

Furthermore, there is a technique in which a management unit updates information stored in a row format in response to an update request and notifies an update request to a column-oriented data processing unit and the column-oriented data processing unit stores information in a column format and generates a query response based on the information stored in the column format in response to a query request. According to this technique, the dichotomy between the OLTP and the OLAP may be suppressed.

Related techniques are disclosed in Japanese Laid-open Patent Publication No. 2015-185104 and Japanese National Publication of International Patent Application No. 2010-539616, for example.

When the BRIN represented in FIG. 12 is used in the column-type database represented in FIG. 10 and FIG. 11, the BRIN becomes ineffective in some cases. FIG. 13A and FIG. 13B are diagrams illustrating an example in which a BRIN is effective and an example in which a BRIN is ineffective, respectively. In FIG. 13A and FIG. 13B, the column-type database stores transaction date and product code.

As represented in FIG. 13A, if only insertion of records into the column-type database is carried out, nearby transaction dates collect at nearby positions. For this reason, in the case of aggregating transactions in the year 2015, the search engine may skip transactions in the year 2016.

On the other hand, as represented in FIG. 13B, if update of a record is carried out in the column-type append-only database, the updated record is appended and therefore a row with a far transaction date comes to a nearby position. In FIG. 13B, the product code on the first row is updated and a new row is appended. For this reason, a transaction in the year 2015 is appended to the transactions in the year 2016 and the transactions in the year 2016 are changed to transactions in the years 2015 and 2016. Therefore, in the case of aggregating the transactions in the year 2015, the search engine is not allowed to skip the transactions in the years 2015 and 2016.

FIG. 14A and FIG. 14B are diagrams illustrating an example in which a BRIN becomes ineffective due to WOS-ROS conversion. As illustrated in FIG. 14A, when three records whose transaction dates are "2015/1/1" to "2015/12/15" exist in the WOS 13 and WOS-ROS conversion is carried out, extent #1 whose range of the transaction date is "2015/1/1 to 2015/12/15" is created. Here, the extent is the unit of the WOS-ROS conversion.

Thereafter, when two records whose transaction dates are "2016/5/15" and "2016/12/10" are inserted and the record whose transaction date is "2015/1/1" is updated, three records are stored in the WOS 13 as illustrated in FIG. 14B. Then, when WOS-ROS conversion is carried out for this WOS 13, extent #2 whose range of the transaction date is "2015/1/1 to 2016/12/10" is created.

For example, because the record whose transaction date is "2015/1/1" is updated, an extent with a large range of the transaction date is created. As above, the WOS-ROS conversion involves a problem that the search performance with use of the BRIN decreases due to creation of an extent in which the BRIN is ineffective.

SUMMARY

According to an aspect of the present invention, provided is an update reflection apparatus including a memory and a processor coupled to the memory. The processor is configured to accumulate first information relating to first records in a write buffer of a row-type. The first records are to update a database of an append-only type. The database is in a column-format. The processor is configured to convert a second record of the first records to a column format. The second record satisfies a specific condition. The processor is configured to append the converted second record to the database.

The object and advantages of the invention will be realized and attained by mean of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram for explaining a BRIN;

FIG. 13A and FIG. 13B are diagrams illustrating an example in which a BRIN is effective and an example in which a BRIN is ineffective, respectively;

FIG. 14B is a second diagram illustrating an example in which a BRIN becomes ineffective due to WOS-ROS conversion.

DESCRIPTION OF EMBODIMENT

An embodiment of a relational database management method, an update reflection apparatus, and a non-transitory computer-readable recording medium having stored therein a program disclosed by the present application will be described in detail below based on the drawings. This embodiment does not limit disclosed techniques.

Figure 1:
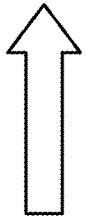
FIG. 1 is a diagram for explaining WOS-ROS conversion by an RDBMS according to an embodiment.

First, WOS-ROS conversion by an RDBMS according to the embodiment will be described. The RDBMS according to the embodiment is an append-only relational database. FIG. 1 is a diagram for explaining WOS-ROS conversion by the RDBMS according to the embodiment. As illustrated in FIG. 1, pieces of transaction data of the year 2015 and pieces of transaction data of the year 2016 are included in the WOS 13.

However, the RDBMS according to the embodiment does not create an extent by carrying out WOS-ROS conversion of all pieces of transaction data included in the WOS 13 but creates an extent by carrying out WOS-ROS conversion of only the pieces of transaction data of the year 2016 and leaves the pieces of transaction data of the year 2015 in the WOS 13. For example, the RDBMS according to the embodiment creates the extent by using only records whose value of a specific column satisfies a given condition. Here, the specific column is a column used for creation of a BRIN.

In FIG. 1, the pieces of transaction data of the year 2015 are not inserted records but updated records. Therefore, the RDBMS according to the embodiment may leave the pieces of transaction data of the year 2015 in the WOS 13 by creating an extent with use of only the inserted records.

As above, by creating an extent by using only the records whose value of the specific column satisfies the given condition, the RDBMS according to the embodiment may create the extent with only records whose values of the specific column are close to each other. Therefore, by employing an extent as a block and creating a BRIN with use of the records whose value of the specific column satisfies the given condition, the RDBMS according to the embodiment may keep the BRIN from becoming ineffective.

Figure 2:
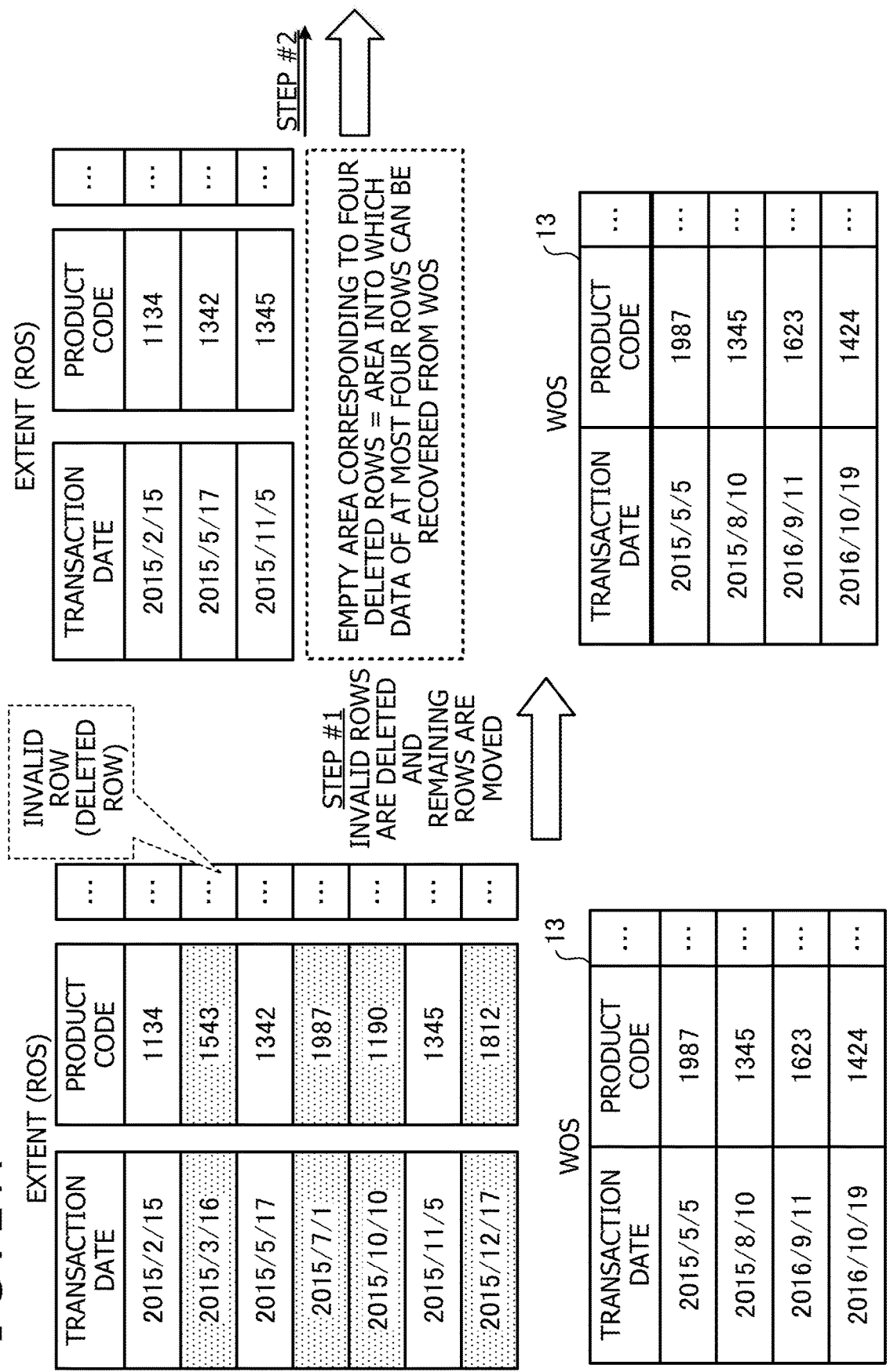
FIG. 2A is a first diagram for explaining recovery of WOS residual records in empty row recovery.
FIG. 2B is a second diagram for explaining recovery of WOS residual records in empty row recovery.

Furthermore, the RDBMS according to the embodiment recovers the records left in the WOS 13 in the WOS-ROS conversion at the time of empty row recovery. FIG. 2A and FIG. 2B are diagrams for explaining recovery of WOS residual records in empty row recovery. FIG. 2A represents step #1 of recovering empty rows of an extent and FIG. 2B represents step #2 of appending nearby records in the WOS 13 to the rear part of the extent. Here, the nearby records are records whose value of the record is within the range of a BRIN of the extent regarding the column with which the BRIN is created.

In the extent illustrated in FIG. 2A, hatched rows are invalid rows. As illustrated in FIG. 2A, in step #1, the RDBMS according to the embodiment creates an empty area at the extent rear part by deleting the invalid rows and moving the remaining rows to fill the resulted empty rows. In FIG. 2A, four invalid rows are deleted and an empty area corresponding to four rows is created.

Then, as illustrated in FIG. 2B, the RDBMS according to the embodiment appends the nearby records in the WOS 13 to the empty area in step #2. In FIG. 2B, the pieces of transaction data of the extent are pieces of transaction data of the year 2015 and two pieces of transaction data of the year 2015 exist in the WOS 13. Thus, the two pieces of transaction data of the year 2015 are appended to the empty area of the extent and pieces of transaction data of the year 2016 are left in the WOS 13.

As above, the RDBMS according to the embodiment may reflect, in the ROS 15, the records left in the WOS 13 in the WOS-ROS conversion by recovering the WOS residual records at the time of empty row recovery.

Figure 3:
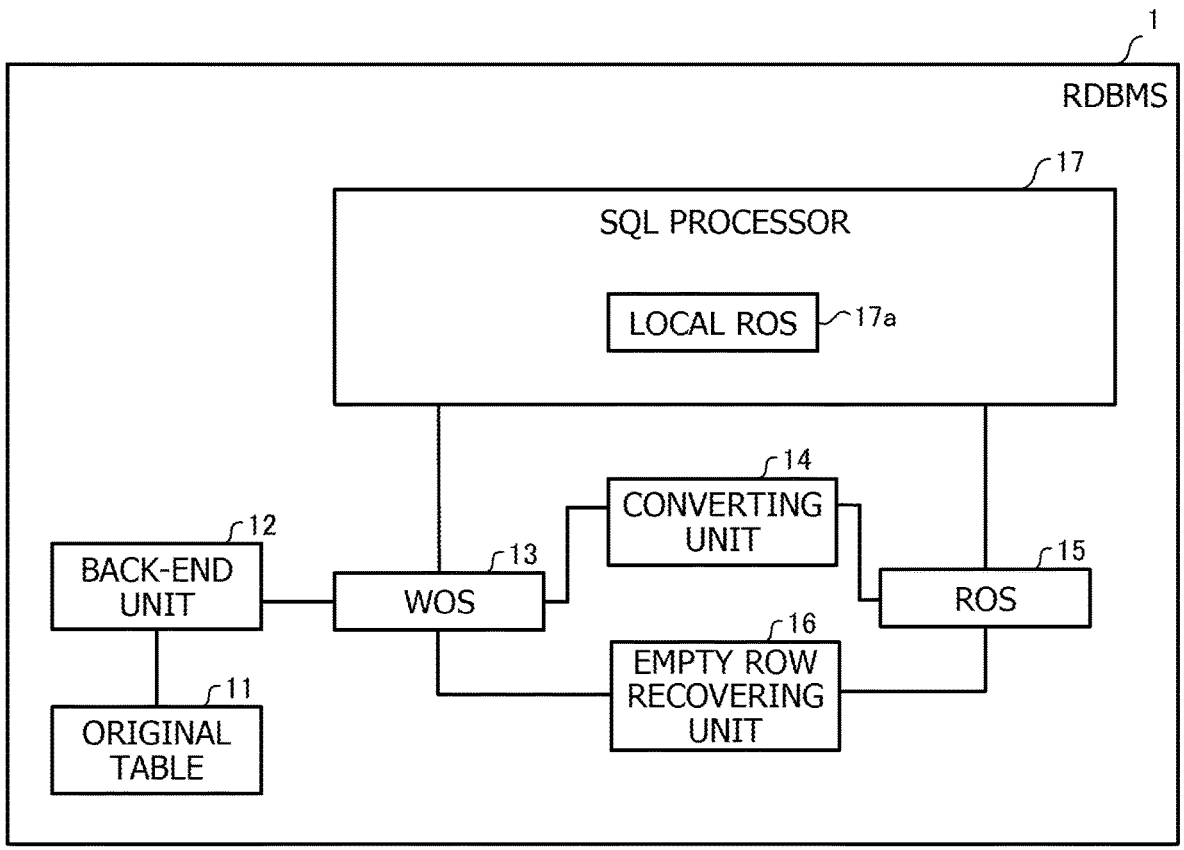
FIG. 3 is a diagram illustrating a functional configuration of an RDBMS according to the embodiment.

Next, a functional configuration of an RDBMS according to the embodiment will be described. FIG. 3 is a diagram illustrating a functional configuration of an RDBMS according to the embodiment. As illustrated in FIG. 3, an RDBMS 1 according to the embodiment includes an original table 11, a back-end unit 12, the WOS 13, a converting unit 14, the ROS 15, an empty row recovering unit 16, and an SQL processor 17. The back-end unit 12, the converting unit 14, and the empty row recovering unit 16 may be implemented in a central processing unit (CPU) 52 described later. The SQL processor 17 may be the CPU 52. The original table 11, the WOS 13, and the ROS 15 may be secured on a main memory 51 described later.

The original table 11 is a row-type database.

The back-end unit 12 carries out insertion of records into the original table 11 and update and deletion of records of the original table 11. Furthermore, the back-end unit 12 updates the WOS 13 in synchronization with operation of the original table 11.

When appending an inserted record to the WOS 13, the back-end unit 12 adds a flag indicating that the relevant record is an inserted record to the inserted record. Furthermore, when appending an updated record to the WOS 13, the back-end unit 12 adds a flag indicating that the relevant record is an updated record to the updated record. This flag is used for converting only inserted records in WOS-ROS conversion. The back-end unit 12 is one example of an accumulating unit.

Figure 4:
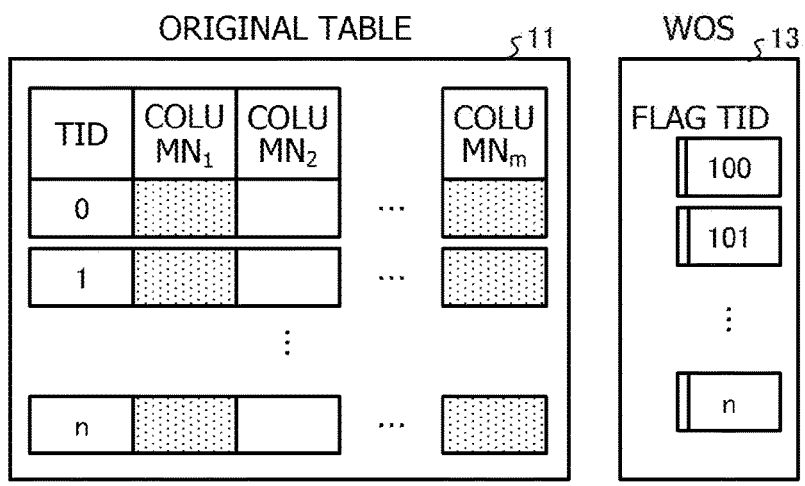
FIG. 4 is a diagram illustrating a data structure of an original table and a WOS.

The WOS 13 is a row-type write buffer and stores the difference between the original table 11 and the ROS 15 by using a tuple-ID (TID). FIG. 4 is a diagram illustrating a data structure of an original table and a WOS. The original table and the WOS depicted in FIG. 4 may be the original table 11 and the WOS 13 depicted in FIG. 3. As illustrated in FIG. 4, the TID is added to each row in the original table 11.

In the description made thus far, it is assumed that the WOS 13 stores records for convenience of explanation. However, actually the WOS 13 stores the TID. Furthermore, to the TID, a flag indicating whether the record is an inserted record or an updated record is added.

The converting unit 14 carries out WOS-ROS conversion to create an extent. However, the converting unit 14 does not create the extent by carrying out WOS-ROS conversion of all records included in the WOS 13 but creates the extent by carrying out WOS-ROS conversion of only inserted records and leaves updated records in the WOS 13. The converting unit 14 determines whether the record in the WOS 13 is an inserted record or an updated record by using the flag added to the TID.

The ROS 15 is a database obtained by converting records of the original table 11 to a column type. The ROS 15 is a collection of extents. Aggregation processing of a column and so forth is executed by using the ROS 15.

The empty row recovering unit 16 recovers empty rows from an extent. The empty row recovering unit 16 creates an empty area at the extent rear part by deleting invalid rows in the extent and moving the remaining rows to fill the resulted empty rows. Then, the empty row recovering unit 16 appends nearby records in the WOS 13 to the empty area.

The SQL processor 17 processes search SQL and carries out a search of a database. When receiving the search SQL, the SQL processor 17 converts the WOS 13 to create the local ROS 17a. Then, the SQL processor 17 carries out the search by using the ROS 15 and the local ROS 17a.

Figure 5:
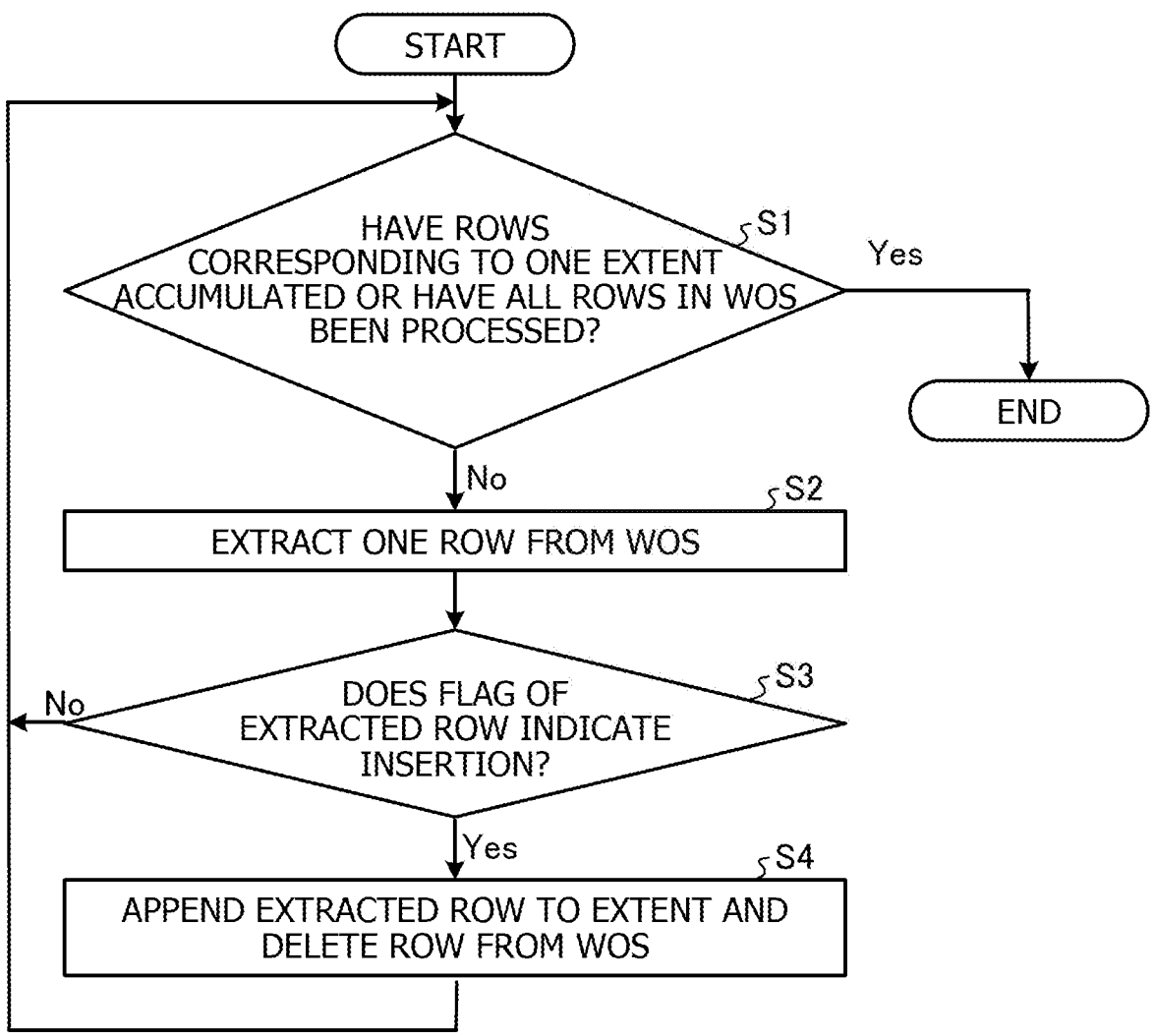
FIG. 5 is a flowchart that represents a flow of WOS-ROS conversion processing.

Next, a flow of WOS-ROS conversion processing will be described. FIG. 5 is a flowchart that represents a flow of WOS-ROS conversion processing. As represented in FIG. 5, the converting unit 14 determines whether the rows corresponding to one extent have been accumulated, and when the rows corresponding to one extent have not been accumulated, the converting unit 14 determines whether all rows in the WOS 13 have been processed (step S1). The converting unit 14 ends the processing when the rows corresponding to one extent have been accumulated or when all rows in the WOS 13 have been processed.

On the other hand, when the rows corresponding to one extent have not been accumulated and a row that has not been processed exists in the WOS 13, the converting unit 14 extracts one row from the WOS 13 (step S2) and determines whether or not the flag of the extracted row indicates insertion (step S3).

Then, if the flag of the extracted row does not indicate insertion, the converting unit 14 returns to the step S1. If the flag indicates insertion, the converting unit 14 appends the extracted row to the extent and deletes the row from the WOS 13 (step S4). Then, the converting unit 14 returns to the step S1.

As above, by appending only inserted rows to an extent, the converting unit 14 may create the extent including only records whose values of the column with which a BRIN is created are close to each other. It is also possible for the converting unit 14 to create an extent while excluding rows whose value of the column with which a BRIN is created is included in an extent created in the past instead of appending only inserted rows to an extent.

Figure 6:
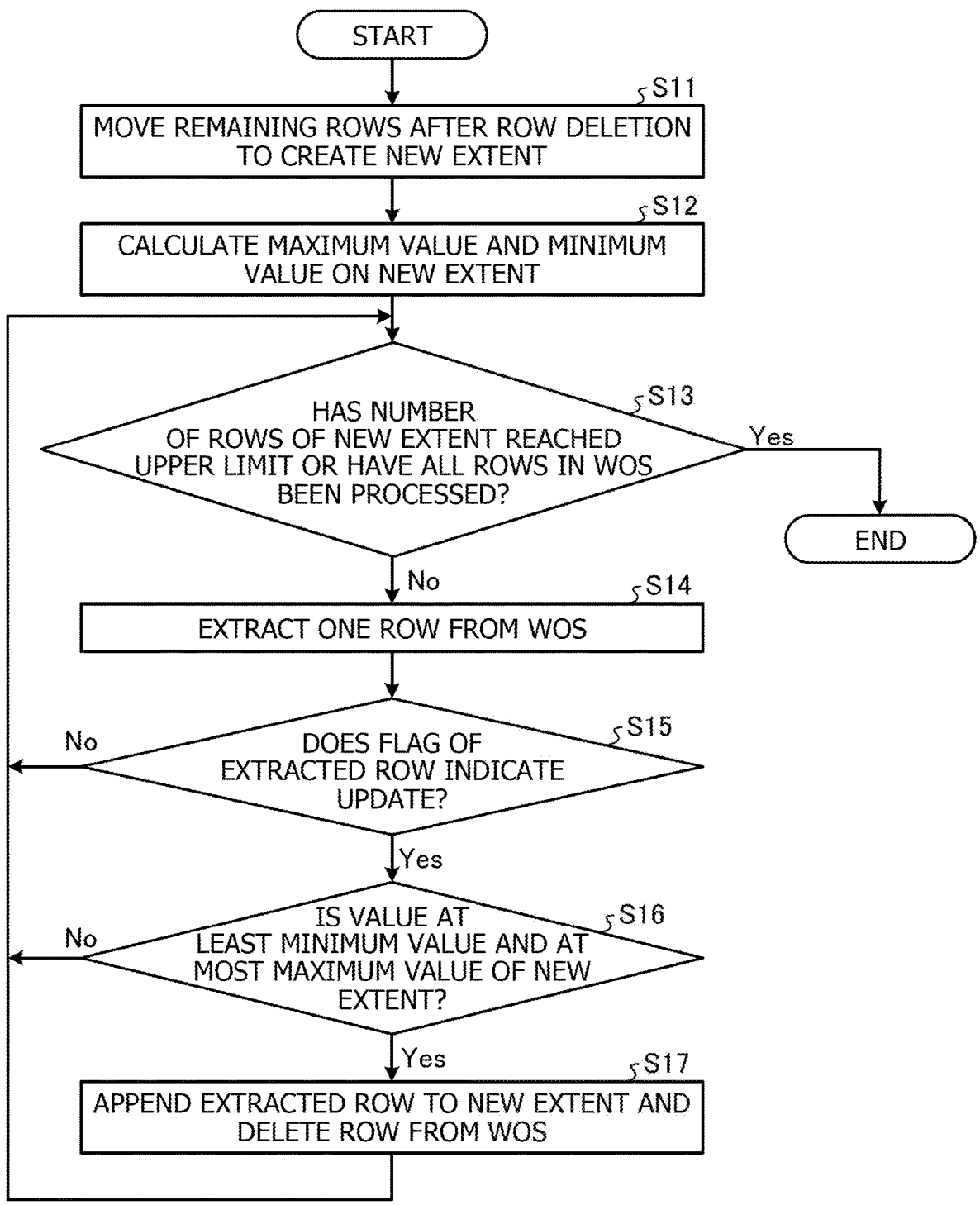
FIG. 6 is a flowchart that represents a flow of empty row recovery processing.

Next, a flow of empty row recovery processing will be described. FIG. 6 is a flowchart that represents a flow of empty row recovery processing. As represented in FIG. 6, the empty row recovering unit 16 moves the remaining rows to fill the resulted empty rows after row deletion to create a new extent (step S11). Then, the empty row recovering unit 16 calculates the maximum value and the minimum value on the new extent regarding the column with which a BRIN is created (step S12).

Then, the empty row recovering unit 16 determines whether the number of rows of the new extent has reached the upper limit, and when the number of rows of the new extent has not reached the upper limit, the empty row recovering unit 16 determines whether all rows in the WOS 13 have been processed (step S13). The empty row recovering unit 16 ends the processing when the number of rows of the new extent has reached the upper limit or when all rows in the WOS 13 have been processed.

On the other hand, if the number of rows of the new extent has not reached the upper limit and a row that has not been processed exists in the WOS 13, the empty row recovering unit 16 extracts one row from the WOS 13 (step S14) and determines whether or not the flag of the extracted row indicates update (step S15).

Then, if the flag of the extracted row does not indicate update, the empty row recovering unit 16 returns to the step S13. If the flag indicates update, the empty row recovering unit 16 determines whether or not the value is at least the minimum value and at most the maximum value of the new extent regarding the column with which the BRIN is created (step S16).

Then, if the value is not at least the minimum value and at most the maximum value of the new extent, the empty row recovering unit 16 returns to the step S13. On the other hand, if the value is at least the minimum value and at most the maximum value of the new extent, the empty row recovering unit 16 appends the extracted row to the extent and deletes the row from the WOS 13 (step S17). Then, the empty row recovering unit 16 returns to the step S13.

As above, if the value of a row extracted from the WOS 13 is at least the minimum value and at most the maximum value of a new extent, the empty row recovering unit 16 appends the extracted row to the extent. Thereby, the empty row recovering unit 16 may reflect, in the ROS 15, the updated records left in the WOS 13 in the WOS-ROS conversion.

Figure 7:
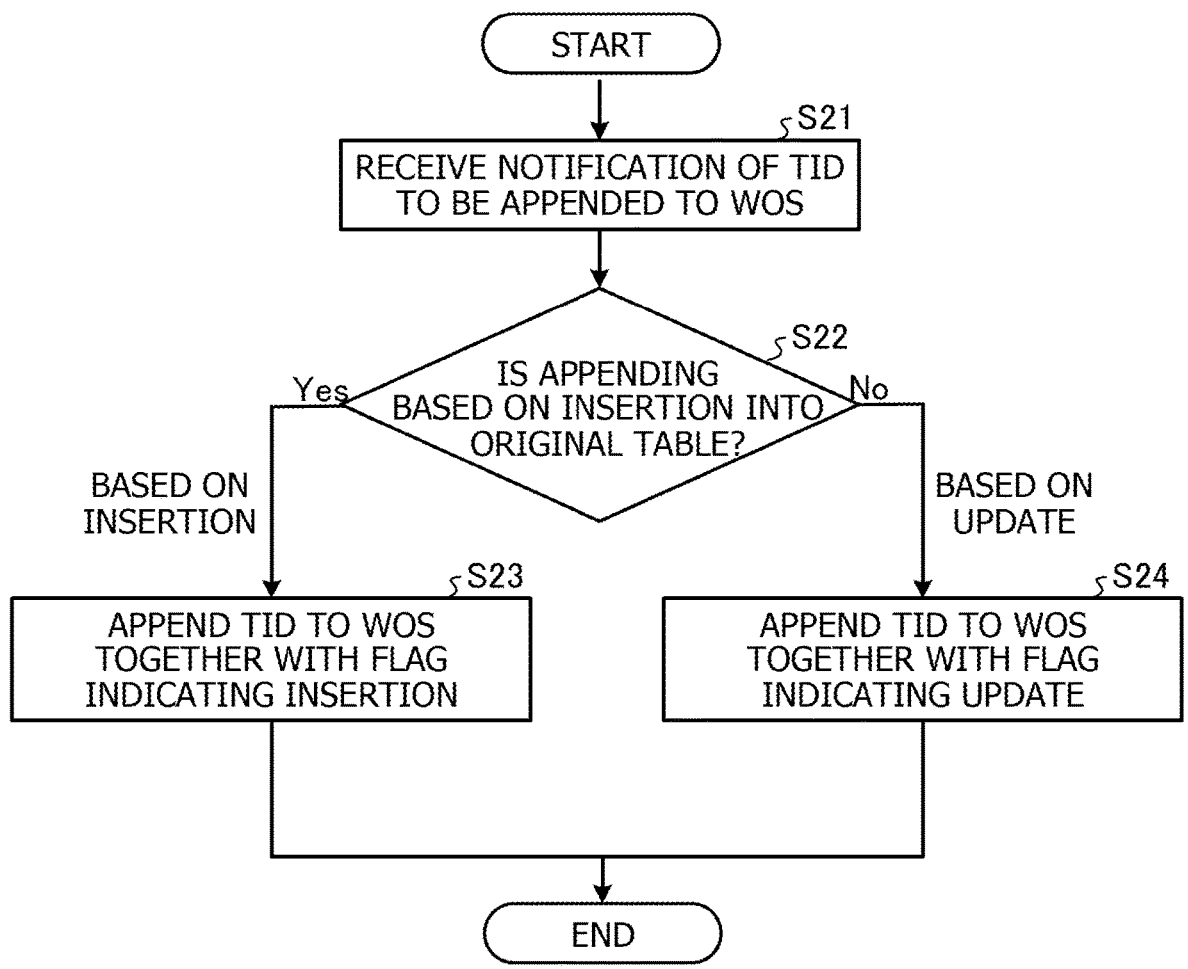
FIG. 7 is a flowchart that represents a flow of processing of adding a flag when a TID is appended to a WOS.

Next, a flow of processing of adding a flag when a TID is appended to a WOS will be described. FIG. 7 is a flowchart that represents a flow of processing of adding a flag when a TID is appended to a WOS. The WOS mentioned in FIG. 7 may be the WOS 13 depicted in FIG. 3.

As represented in FIG. 7, the back-end unit 12 receives a notification of the TID to be appended to the WOS 13 (step S21) and determines whether or not the appending is based on insertion into the original table 11 (step S22).

Then, if the appending is based on insertion, the back-end unit 12 appends the TID to the WOS 13 together with a flag indicating insertion (step S23). If the appending is not based on insertion, the back-end unit 12 appends the TID to the WOS 13 together with a flag indicating update (step S24).

As above, the back-end unit 12 appends the TID to the WOS 13 together with the flag indicating insertion or update. This allows the converting unit 14 to create an extent by using only inserted records in WOS-ROS conversion.

Figures 8, 9:
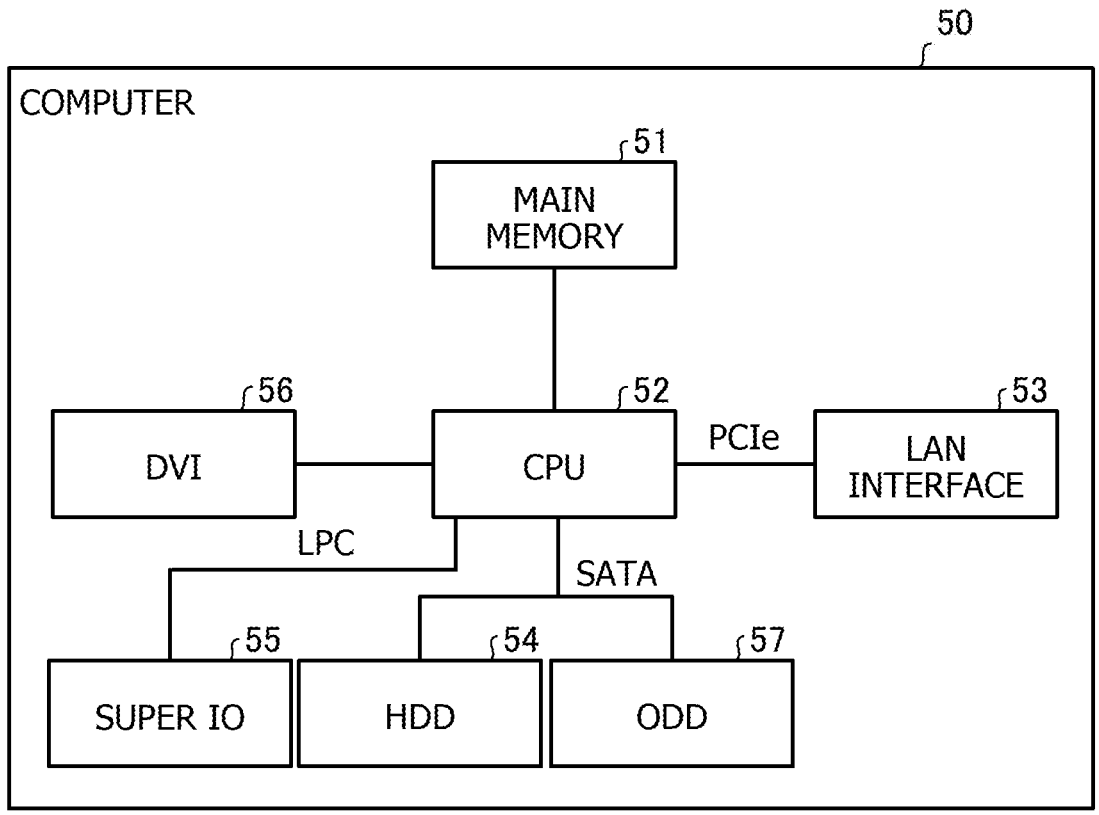
FIG. 8 is a diagram illustrating a hardware configuration of a computer that executes an RDBMS.
FIG. 9 is a diagram illustrating characteristics of OLTP and OLAP.
Figure 10:
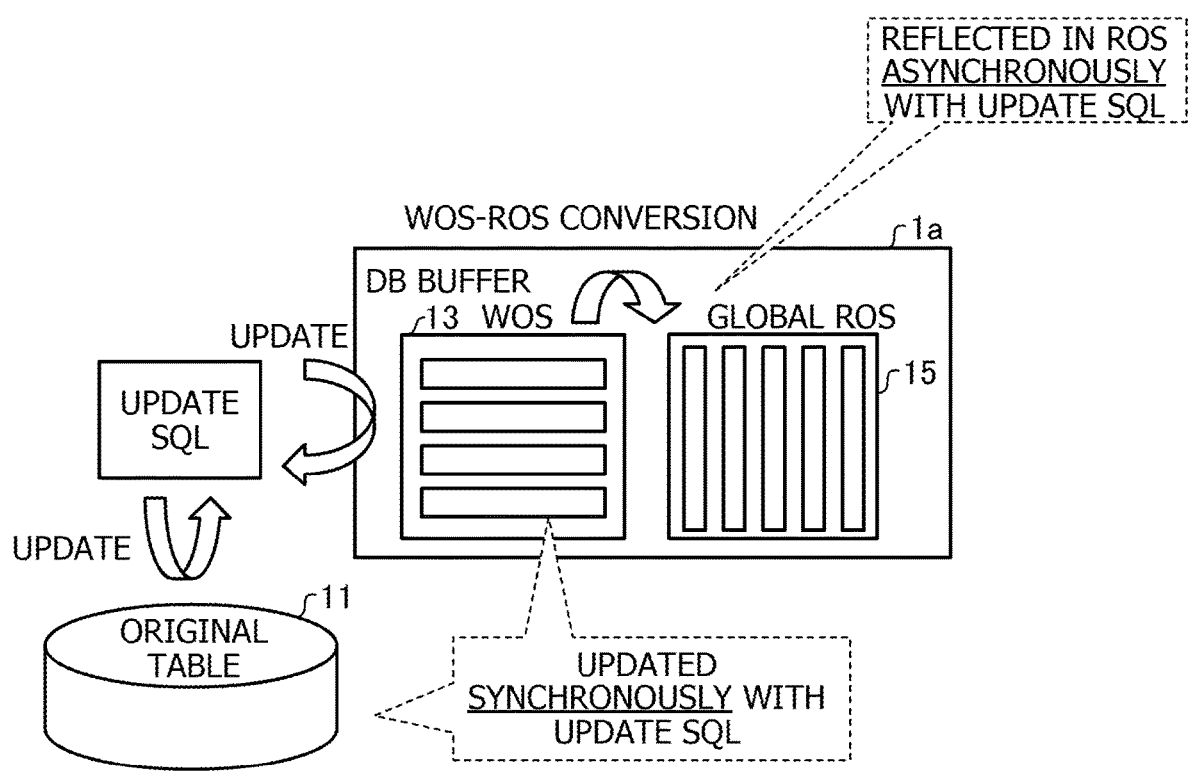
FIG. 10 is a diagram for explaining processing to update SQL.
Figure 11:
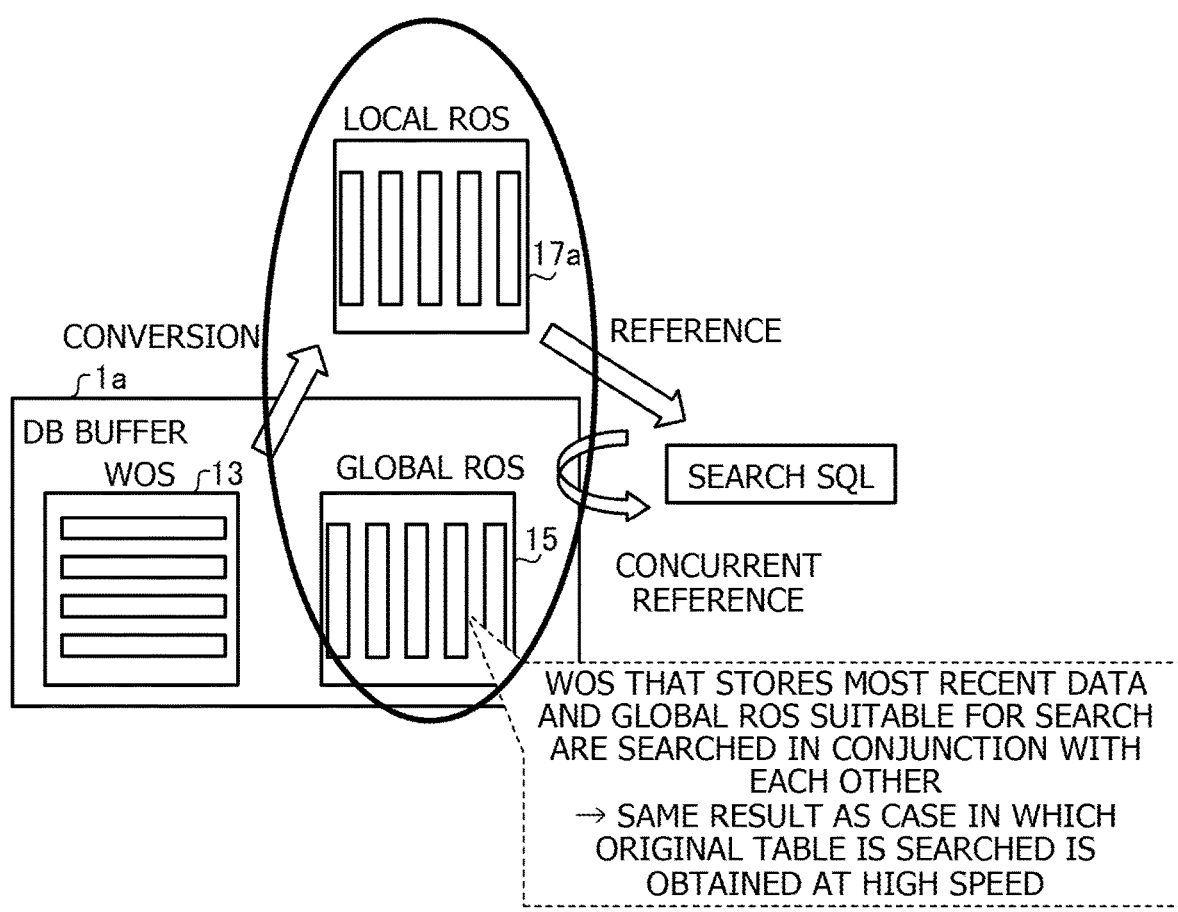
FIG. 11 is a diagram for explaining processing to search SQL.
Figure 14A:
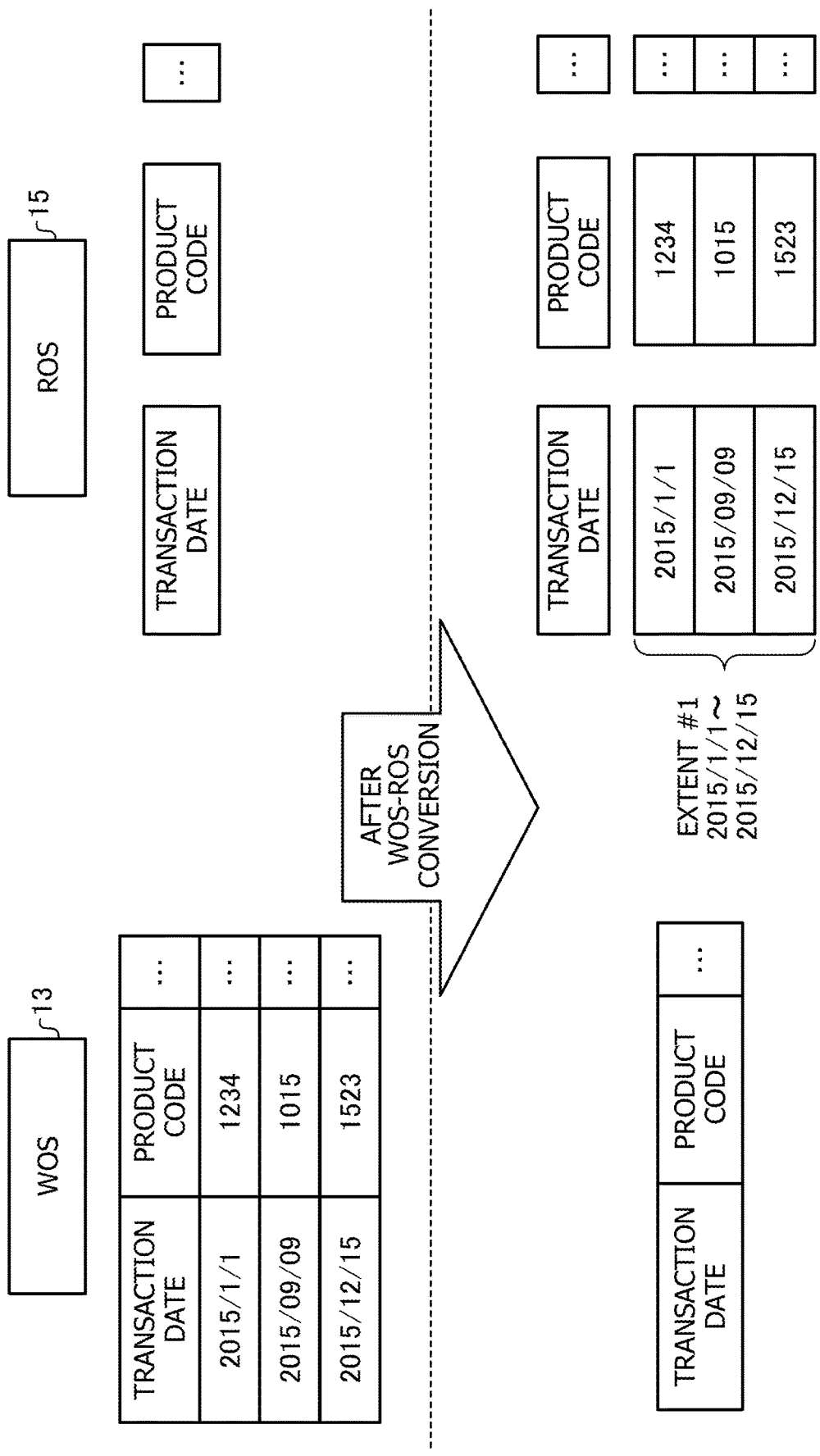
FIG. 14A is a first diagram illustrating an example in which a BRIN becomes ineffective due to WOS-ROS conversion.

Next, a computer that executes an RDBMS will be described. FIG. 8 is a diagram illustrating a hardware configuration of a computer that executes an RDBMS. The RDBMS executed by the computer depicted in FIG. 8 may be the RDBMS 1 depicted in FIG. 3. As illustrated in FIG. 8, a computer 50 has the main memory 51, the CPU 52, a local area network (LAN) interface 53, and a hard disk drive (HDD) 54. Furthermore, the computer 50 has a super input output (IO) 55, a Digital Visual Interface (DVI) 56, and an optical disk drive (ODD) 57.

The main memory 51 is a memory that stores a program, an execution halfway result of a program, and so forth. The CPU 52 is a central processing unit that reads out a program from the main memory 51 and executes the program. The CPU 52 includes a chipset including a memory controller.

The LAN interface 53 is an interface for coupling the computer 50 to another computer via a LAN. The HDD 54 is a disk device that stores programs and data and the super IO 55 is an interface for coupling input devices such as mouse and keyboard. The DVI 56 is an interface to which a liquid crystal display device is coupled and the ODD 57 is a device that carries out reading and writing of a digital versatile disc (DVD).

The LAN interface 53 is coupled to the CPU 52 based on the Peripheral Component Interconnect Express (PCIe) and the HDD 54 and the ODD 57 are coupled to the CPU 52 based on the Serial Advanced Technology Attachment (SATA). The super IO 55 is coupled to the CPU 52 based on the Low Pin Count (LPC).

Furthermore, the RDBMS 1 executed in the computer 50 is stored in a DVD and is read out from the DVD by the ODD 57 to be installed on the computer 50. Alternatively, the RDBMS 1 is stored in a database or the like of another computer system coupled through the LAN interface 53 and is read out from this database to be installed on the computer 50. Then, the installed RDBMS 1 is stored in the HDD 54 and is read out to the main memory 51 to be executed by the CPU 52.

As described above, in the embodiment, the back-end unit 12 appends the TID to the WOS 13 when carrying out insertion of a record into the original table 11 and update of a record of the original table 11. Furthermore, when carrying out WOS-ROS conversion, the converting unit 14 creates an extent by using only records that satisfy a specific condition regarding the column with which a BRIN is created. Therefore, the RDBMS 1 may create an extent in which values are close to each other regarding the column with which the BRIN is created and may suppress the lowering of the search performance with use of the BRIN.

Furthermore, in the embodiment, the converting unit 14 creates the extent by using only inserted records as the records that satisfy the specific condition. Therefore, if the column with which the BRIN is created is time-series data, the converting unit 14 may create the extent while excluding records whose value of the column with which the BRIN is created is included in an extent created in the past.

Moreover, in the embodiment, the converting unit 14 determines whether or not the specific condition is satisfied based on the value of the column with which the BRIN is created. Therefore, if the column with which the BRIN is created is time-series data, the converting unit 14 may create an extent while excluding records whose value of the column with which the BRIN is created is included in an extent created in the past.

In addition, in the embodiment, if an invalid row is deleted from an extent, the empty row recovering unit 16 extracts a record that satisfies a BRIN of this extent from the WOS 13 and appends the record to this extent. Therefore, the RDBMS 1 may reflect the records left in the WOS 13 by the converting unit 14 in the ROS 15.

Furthermore, in the embodiment, the back-end unit 12 appends a flag indicating that appending is based on insertion or update when appending the TID to the WOS 13, and the converting unit 14 determines whether the relevant record is an inserted record or an updated record by using this flag. Therefore, the converting unit 14 may easily determine whether the relevant record is an inserted record or an updated record.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    storing a collection of rows in a write optimized store (WOS);
    accumulating first information relating to first records in a write buffer of a row-type, the first records being to update a database of an append-only type, the database being in a column-format;
    determining whether rows corresponding to one extent have been accumulated;
    when a determination is made that the rows corresponding to the one extent have not been accumulated:
        extracting a row from the first records; and
        determining whether a flag of the row extracted indicates an insertion;
    converting a second record of the first records to a column format, the second record including a column value within a range of a block-range index;
    appending the converted second record to the database;
    deleting invalid rows in the extent
    moving rows remaining in the extent to empty rows created by the deleting to create an empty area; and
    appending records from the WOS to the empty area.

2. The non-transitory computer-readable recording medium according to claim 1, wherein the second record is a record to be inserted into the database.

3. The non-transitory computer-readable recording medium according to claim 2, the process further comprising:
    adding second information to the first information when the first information relating to the second record is accumulated in the write buffer, the second information indicating that the second record is a record to be inserted into the database; and
    determining the second record using the second information.

4. The non-transitory computer-readable recording medium according to claim 1, the process further comprising:
    converting a third record of the first records to a column format, the third record not including the column value within the predefined range; and
    appending the converted third record to the database when an empty row is recovered.

5. An update reflection apparatus, comprising:
    a memory; and
    a processor coupled to the memory and the processor configured to:
    store a collection of rows in a write optimized store (WOS);
    accumulate first information relating to first records in a write buffer of a row-type, the first records being to update a database of an append-only type, the database being in a column-format;
    determine whether rows corresponding to one extent have been accumulated;
    when a determination is made that the rows corresponding to the one extent have not been accumulated:
        extract a row from the first records; and
        determine whether a flag of the row extracted indicates an insertion;
    convert a second record of the first records to a column format, the second record including a column value within a range of a block-range index;
    append the converted second record to the database;
    delete invalid rows in the extent
    move rows remaining in the extent to empty rows created by the deleting to create an empty area; and
    append records from the WOS to the empty area.

6. A relational database management method, comprising:
    storing, by a computer, a collection of rows in a write optimized store (WOS);
    accumulating a plurality of rows of at least one extent, the accumulating comprises adding a flag to a record indicating that the record is an inserted record;
    determining whether rows corresponding to one extent have been accumulated;
    when a determination is made that the rows corresponding to the one extent have not been accumulated:
        extracting a row from the first records; and
        determining whether a flag of the row extracted indicates an insertion;
    convert a second record of the first records to a column format, the second record including a column value within a range of a block-range index;
    determining whether the plurality of rows corresponding to the at least one extent have been accumulated;
    determining whether all rows in the WOS have been processed;
    extracting one row from the WOS when a determination is made that the plurality of rows have been accumulated or all of the rows in the WOS have been processed;
    determining whether the one row has been inserted based on an update;
    appending the one row to the extent; and
    deleting the one row from the WOS.

7. The relational database management method of claim 6, wherein the appending comprises adding a flag to a record indicating that the record is an updated record.

8. The relational database management method of claim 6, further comprising locking rows after the deleting the one row to create a new extent.

9. The relational database management method of claim 8, further comprising calculating a maximum value and a minimum value of the new extent.

10. The relational database management method of claim 9, further comprising determining whether a number of rows of the new extent reached a threshold or whether all rows in the WOS have been processed.

11. The relational database management method of claim 10, further comprising determining whether a value of the one row is the minimum value or the maximum value.

12. The relational database management method of claim 6, further comprising:
    deleting invalid rows in the extent;
    moving rows remaining in the extent to empty rows created by the deleting to create an empty area; and
    appending records from the WOS to the empty area.

* * * * *